July 8, 1958   J. H. EDMAN   2,842,006
DRIVE MECHANISM
Filed June 1, 1954   2 Sheets-Sheet 1
FIG. 1
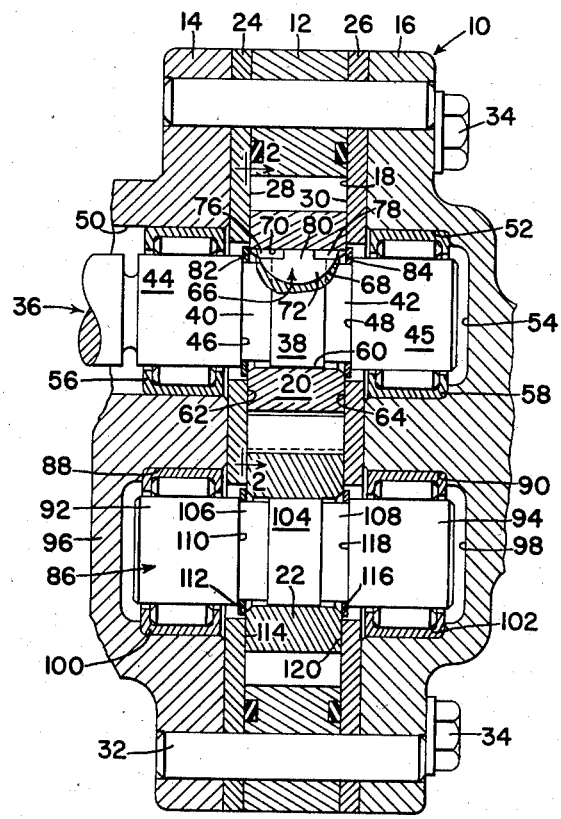
FIG. 2
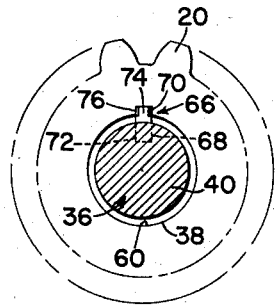
FIG. 4
FIG. 3
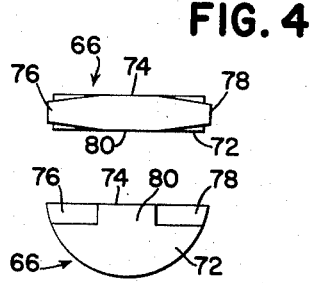
INVENTOR.
JOHN H. EDMAN July 8, 1958 J. H. EDMAN 2,842,006
DRIVE MECHANISM
Filed June 1, 1954 2 Sheets-Sheet 2

INVENTOR.
JOHN H. EDMAN

United States Patent Office 2,842,006
Patented July 8, 1958

2,842,006
DRIVE MECHANISM

John H. Edman, Waterloo, Iowa, assignor to Deere Manufacturing Co., Dubuque, Iowa, a corporation of Iowa Application June 1, 1954, Serial No. 433,512

4 Claims. (Cl. 74—434)

This invention relates to driving mechanism and more particularly to what may be called a floating mounting for a rotor member on a shaft. The application is a continuation-in-part of copending application Serial No. 388,767, filed October 28, 1953, now abandoned.

The invention finds particular utility in the design of fluid pumps where it is desirable to increase the efficiency of the pump while at the same time lowering the cost of production by eliminating to as great an extent as possible the requirement for high accuracy and close tolerances. A typical fluid pump comprises a housing having a pair of parallel inner walls spaced apart to define a pump cavity. A shaft extends across the cavity for rotation on an axis normal to the walls and a gear is mounted on the shaft so that the opposite radial faces of the gear respectively have close running tolerances with the inner surfaces of the cavity walls. This gear or equivalent rotor member will mesh with one or more other pump gears, which will be mounted in a like manner. One of the shafts must be rotatable and one of the gears must be keyed to that shaft for rotation of the two in unison. If the shaft is rigidly keyed to the gear and the axis of the shaft is not exactly normal to the gear and the axis of the shaft is not exactly normal to the surfaces of the walls, the faces of the gear and the surfaces of the wall will not be parallel and the gear will bind and eventually score the walls so that fluid leakage is the inevitable result. Likewise, the shaft-receiving bore in the gear may not be exactly perpendicular to the radial faces of the gear and the same result will follow. If dimensional tolerances across the radial faces of the gear or between the cavity walls are relaxed, then the running clearance is enlarged and binding and scoring are prevented but only at the expense of fluid leakage, resulting in a pump having an initial low efficiency. Various types of floating gear or rotor mountings have been devised in the past to overcome these difficulties and these have consisted largely of enlarging the bore of the gear so that it fits loosely on the shaft, but considerable difficulty has been experienced because of binding occasioned by the tight fit between the gear and the shaft as established by the driving key. Moreover, means heretofore used to hold the shafts against axial displacement have increased the thrust loading on the gears and this combined with the binding occasioned by the driving key has left previous designs somewhat short of the optimum.

According to the present invention, the shaft is journaled in the pump by bearings spaced at opposite sides respectively of the cavity and the shaft has a central cylindrical portion of less axial length than the distance between the walls of the cavity so as to confine the intimate contact between the shaft and the gear to a relatively short axial and cylindrical zone. It is a further object to utilize improved driving means, preferably in the form of a modified key of the Woodruff type in which the straight portion that engages the keyway in the gear is relieved at opposite ends so as to minimize the intimate driving contact between the key and the gear, confining this driving contact to a relatively axially short zone midway between the radial faces of the gear. The improved driving relationship between the shaft and the gear permits the gear to accommodate itself to the walls of the cavity without interference from the shaft. A still further object resides in means for confining the shaft against axial displacement by limiting the retaining means to contact between the gear and shaft, relieving the shaft of contact with the housing in any other manner.

Another object of the invention is to accomplish the above-noted features and advantages by an alternate construction in which the gear is provided with a bore and a pair of counterbores which provide at a central portion of the gear an annular rib, in which rib alone the keyway is provided. The axial length of the key is greater than the axial dimension of the rib; therefore, end portions of the key project into the counterbores, respectively, and accomplish the floating mounting.

These and other important objects and desirable features inherent in and encompassed by the invention will become apparent as two preferred embodiments of the invention are disclosed in the following detailed description and accompanying sheets of drawings, the several figures of which are described immediately below.

Fig. 1 is a cross sectional view through a two-gear pump embodying the principles of the invention.

Fig. 2 is a fragmentary sectional view taken substantially along the line 2—2 of Fig. 1.

Fig. 3 is an elevational view, on an enlarged scale, of the modified driving key.

Fig. 4 is a plan view of the key shown in Fig. 3.

Figs. 1–4

Figure 5:
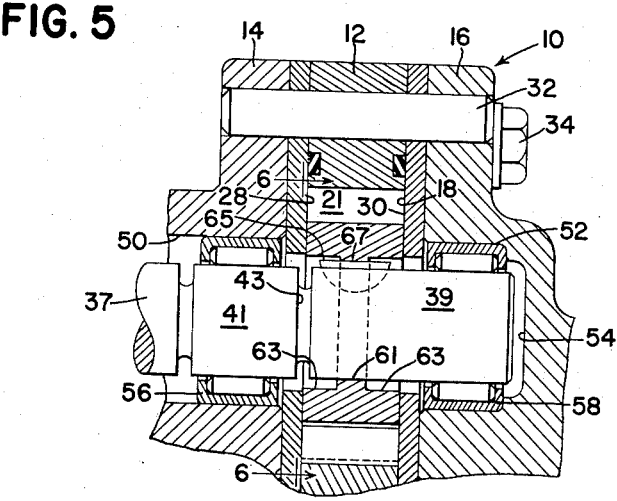
Fig. 5 is a fragmentary sectional view of a modified form of construction.

The pump, which is representative of one form of device in which the invention finds utility, comprises essentially a housing 10 made up of a central part 12 and a pair of flanking outer parts 14 and 16. The central part, as is conventional, spaces the outer parts 14 and 16 apart so as to define a pump cavity 18 in which rotor members or pump gears 20 and 22 are mounted. The support afforded by the outer parts 14 and 16 may be supplemented by a pair of liners or wear plates 24 and 26 which respectively have inner surfaces or walls 28 and 30 actually defining the pump cavity 18. The parts 12, 14, 16, 24 and 26 may be appropriately and rigidly secured together as by a plurality of dowels 32 and machine screws 34.

The pump gear or rotor member 20 is mounted on a driving or input shaft member 36 which is of novel design having a central cylindrical portion 38 of an axial length materially less than the axial distance between the walls 28 and 30. This portion 38 is flanked respectively at opposite sides by coaxial shaft portions 40 and 42, these being of reduced diameter as respects the diameter of the portion 38 and these in turn respectively flanked by coaxial enlarged cylindrical portions 44 and 46 preferably of the same diameter as the central portion 38. The junction of the reduced portion 40 and the enlarged portion 44 affords an annular means defining a radial shoulder 45. A similar shoulder 48 occurs at the other side of the central portion 38; that is, between the reduced portion 42 and the enlarged portion 46. The portions 44 and 46 are prespectively received in bores 50 and 52 in the housing or support parts 14 and 16. In the case of the mounting for the shaft 36, the bore 52 is closed at its end as at 54. Antifriction bearings of any well known type, such as represented at 56 and 58 serve to journal the shaft portions 44 and 46 respectively in the bores 50 and 52.

The gear or rotor member 20 has a central shaft-receiving bore 60 that loosely surrounds the central cylindrical portion 38 of the shaft. The respective dimensions of the parts, given here in inches, are such that the diameter of the shaft portions 38, 44 and 46 is .9997, the reduced portions 40 and 42 are .900 and the gear bore is 1.0008.

The gear 20 has opposite radial faces 62 and 64 respectively adjacent the walls 28 and 30 and having close running clearances therewith. Preferably, the tolerances achieved by an axial spacing between the walls 28 and 30 of .9605 and an axial width of the gear of .9047.

When the design is considered on the basis of the extent described thus far, it will be noted that the tolerance between the shaft bore 60 and the central cylindrical portion 38 of the shaft and the tolerance between the radial faces 60 and 64 of the gear and the inner walls 28 and 30 are such as to accommodate considerable normal inaccuracy between the shaft and gear as respects departure from a perpendicular relationship between the axis of the shaft 36 and the bore 60 of the gear. Departure from the perpendicular relationship may also occur because of a minor defect in the coaxial alinement of the bores 50 and 52 in the housing parts 14 and 16. Any defect of this nature may cause cocking of the shaft 36 relative to the wall surfaces 28 and 30, but as long as there is sufficient clearance between the shaft portion 38 and the shaft bore 60, the opposite radial faces 62 and 64 may accommodate themselves to the walls 28 and 30 without any binding due to a tight fit with the shaft, since there is no such tight fit.

Nor is this relationship interfered with by driving means establishing a driving connection between the shaft and gear, for this driving means, according to the invention, readily permits the accommodation of the shaft to its bearing mounting while permitting accommodation of the gear to the walls of the cavity. This driving means includes a modified driving key 66, here shown as being of the Woodruff type and illustrated in detail in Figs. 3 and 4. The shaft member 36 has an axial keyway 68 confined largely to the cylindrical portion 38 but extending axially in opposite directions into the reduced portions 40 and 42. The gear 20 has an axial keyway 70 in the inner surface of the shaft bore 60 and the two keyways are adapted to be registered to receive the key 66.

The key has an arcuate first part 72 that is received by or relatively closely fits the keyway 68 in the shaft and an integral radially projecting straight second part 74 that enters the keyway 70 in the gear 20. In a preferred construction, the shaft and gear keyways are of uniform width measured circumferentially as respects the axis of the shaft 36, preferably on the order of .1598 plus or minus .0025. The key 66 has, except as will be pointed out subsequently, a uniform thickness throughout of, preferably, .15625. The exception just noted occurs in axially opposite end portions 76 and 78, both of which are uniformly reduced in thickness as illustrated best in Fig. 4, to provide the straight part 74 of the key with a central portion 80 lying midway between the reduced end portions 76 and 78. The reduction in thickness may, at each side of each end portion be on the order of from .005 to .015, giving each end portion a thickness on the order of from .15595 to .15615.

The end portions 76 and 78 extend or taper back to the central portion 80 so as to leave this central portion with an axial length on the order of .250, which as will be seen, is materially less than the axial dimension between the support walls 28 and 30. Since the end portions 76 and 78 are relieved and are therefore of a thickness reduced as respects the circumferential width of the keyway 70, intimate driving contact between the key 66 and the gear 20 is confined to a central zone midway between the walls 28 and 30 and of an axial length materially less, as previously stated, than the axial distance between these walls. Therefore, the key, although sufficient to establish a driving connection between the shaft and the gear has taken into account the possibilities of misalinement so that the gear and shaft may respectively accommodate themselves to the walls and the bearings, and neither will impose any binding effects on the other. At the same time, the tolerances between the radial faces 62 and 64 of the gear and the cavity walls 28 and 30 may be maintained within sufficiently close limits to assure a substantially perfect fluid seal.

The shaft 36 is maintained against axial displacement relative to the gear 20 by a pair of retaining means, each preferably in the form of a snap ring, as designated by the numerals 82 and 84. The ring 82 is received between the shoulder 45 on the shaft 36 and the proximate radial face 62 of the gear 20. The other ring occupies a symmetrical position at the other side of the gear. Thus, if accommodation of the gear to the cavity walls 28 and 30 requires axial shifting of even the most minor nature, the shaft, being retained by the gear, cannot restrict the gear.

The mounting of the pump idler gear 22 on a shaft 86 is very similar to the construction just described, with the exception of the key and with the further exception of the closure of both bearing-retaining bores 88 and 90 within which opposite ends 92 and 94 of the shaft are mounted. In this case, the bores 88 and 90 are respectively closed at their ends 96 and 98, and the shaft end portions 92 and 94 are respectively journaled in antifriction bearings 100 and 102. The shaft has a central cylindrical portion 104 just like the cylindrical portion 38 on the shaft 36 and this portion 104 is flanked respectively at opposite sides by coaxial cylindrical portions 106 and 108 of reduced diameter. The junction of the reduced portion 106 with the end portion 92 affords an annular shoulder 110 for receiving retaining means in the form of a snap ring 112 that cooperates between the shoulder and the proximate radial face 114 of the gear 22 in a manner similar to the functioning of the snap ring 82, previously described. A second snap ring 116 abuts an annular shoulder 118 provided at the junction of the reduced shaft portion 108 and the proximate end portion 94 of the shaft, the snap ring abutting as well the opposite radial face 120 of the gear 22 so that the two snap rings serve to retain the shaft 86 against axial displacement relative to the gear. Since the opposite ends of the shaft are free from contact with or are axially spaced from the end closures 96 and 98 of the bores 88 and 90, the housing parts do not interfere with the shaft and the shaft is retained solely by the gear. Tolerances previously outlined in connection with the shaft 36, gear 20 and cavity walls 28 and 30 apply to the arrangement of the idler gear.

Figure 6:
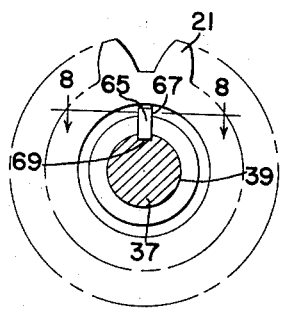
Fig. 6 is a fragmentary sectional view as seen along the line 6—6 of Fig. 5.
Figure 7:
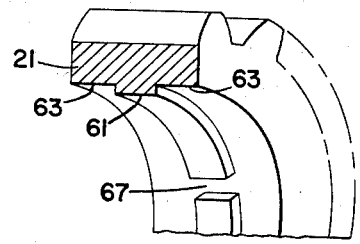
Fig. 7 is a fragmentary perspective view of the gear.
Figure 8:
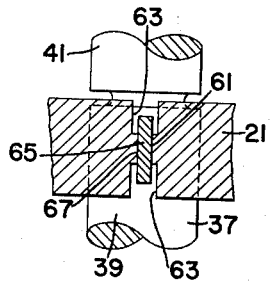
Fig. 8 is a fragmentary sectional view on the line 8—8 of Fig. 6.

*Figs. 5–8*

In the modified form of construction, the parts that are common to this form and to the form of Figs. 1–4 bear the same reference characters. Thus, the structure will be recognized as comprising a housing 10 having the various parts 12, 14, 16, etc.

As distinguished from the previously described design, the design of Figs. 5–8 comprises a pump shaft 37 having a portion 39 thereof of uniform diameter, flanked by a portion 41 separated from the portion 39 by an annular groove 43. The portions 41 and 39 are journaled in bearings 56 and 58 contained in bearing cavities 50 and 52, just as in Figs. 1–4.

The gear 20 is replaced by a gear 21 which has an axially centrally disposed rib 61 established by a main bore through the gear and by counterbores 63, one at each side of the rib 61.

The diameter of the shaft portion 39 is, in inches, .9997. The diameter of the bore that forms the rib 61 is 1.0008, and each of the counterbores has a diameter of 1.156. The axial width of the annular bore rib 61 is approximately .375.

The gear 21 is keyed to the shaft portion 39 by means of a conventional Woodruff key 65 which has an axial length of approximately .625 and a thickness of .125. The feature of this phase of the design is that only the rib 61 has a keyway therein for engaging the key 65. This keyway is designated by the numeral 67 and has a circumferential dimension or width of .1295, as compared to the corresponding dimension of .125 of the key 65. Because the axial length of the key is greater (.625) than the axial width of the annular rib 61 (.375), opposite ends of the key project respectively into the counterbores 63. The curved part of the key is relatively tightly received in a keyway 69 in the shaft portion 39 of the shaft 37. Thus, the advantages of the construction of Figs. 1–4 are achieved in a different but equivalent manner and it is deemed unnecessary to reiterate these various features.

Features of the invention not specifically enumerated herein will undoubtedly occur to those versed in the art, as will numerous modifications and variations in the preferred embodiments of the invention illustrated, all of which may be achieved without departing from the spirit and scope of the invention.

What is claimed is:

1. Drive means of the character described, comprising: a support having a pair of parallel spaced walls; a shaft member journaled at its opposite ends respectively in the walls for rotation on an axis normal to the walls and having an axial keyway in that portion of its outer surface between the walls; a rotor member having a central bore loosely received by the shaft member between the walls and further having opposite radial faces respectively juxtaposed relative to the walls so that the walls limit axial displacement of the rotor member relative to the support, said rotor member having an axial keyway in its bore in register with the shaft member keyway and a driving key connecting the rotor and shaft members for rotation in unison and including one part received in one keyway and an integral part projecting radially therefrom into the other keyway, said radially projecting part having a keyway-engaging central portion midway between the walls and axially spaced end portions flanking said central portion and lying within the length of said other keyway, said end portions being of reduced circumferential thickness as respects the keyway and said central portion so as to be free from intimate driving contact with said other keyway.

2. Drive means of the character described, comprising a housing having a cavity defined by a pair of parallel spaced apart inner walls; a shaft journaled in the housing and extending across the cavity on an axis normal to the walls, said shaft in that portion thereof between the walls having therein an elongated axial keyway in its outer surface; a rotor member having a central bore loosely receiving the shaft further having opposite parallel radial faces respectively having close-running clearances with the walls, said rotor member having an axial keyway opening at the inner surface of its bore and in register with the keyway in the shaft; each keyway being, throughout its length, of uniform width measured circumferentially as respects the shaft axis and said widths being substantially equal; and an elongated driving key received in the registering keyways, said key having a first part relatively tightly received in one keyway and an integral second part of a length but slightly less than the axis distance between the rotor faces and provided with opposite flat faces respectively engaging the walls of the other keyway, and said second part and said other keyway being so relatively shaped and proportioned that said flat faces of the second part fit said other keyway relatively tightly in a zone that occupies substantially the central third of the axial distance between the rotor faces and said second part including axial extensions of its said faces in substantially the end thirds of said distance and respectively at opposite axial sides of said zone and out of intimate contact with the walls of said other keyway.

3. Drive means of the character described, comprising: a housing having a cavity defined by a pair of parallel spaced apart inner walls; a shaft journaled in the housing and extending across the cavity on an axis normal to the walls, asid shaft in that portion thereof between the walls having therein an axial keyway in its outer surface; a rotor member having a central bore loosely receiving the shaft and further having opposite parallel radial faces respectively having close running clearances with the walls, said rotor member having an axial keyway opening at the inner surface of the bore and in register with the keyway in the shaft; each keyway being, throughout its length, of uniform width measured circumferentially as respects the shaft axis and said widths being equal; and a driving key having a shaft-engaging part received in the shaft keyways and an integral rotor-engaging part received in the rotor keyway, said shaft-engaging part of the key being of uniform circumferential thickness so as to closely fit the shaft keyway and said rotor-engaging part having such length as to extend substantially between but just short of the opposite faces of the rotor, said rotor-engaging part in substantially the central third of its length being also of uniform circumferential thickness to afford opposite flat faces on said central third which closely fit the rotor keyway, and said rotor-engaging part having the axially opposite end thirds of its length of reduced circumferential thickness so as to relatively loosely fit the rotor keyway.

4. Drive means of the character described, comprising a housing having a cavity defined by a pair of parallel spaced apart inner walls; a shaft journaled in the housing and extending across the cavity on an axis normal to the walls, said shaft in that portion thereof between the walls having therein an elongated axial keyway in its outer surface; a rotor member having a central bore flanked at each side by a larger counterbore, said bore and counterbores forming on the interior of the rotor member an annular rib of a diameter tolerably greater than the diameter of the shaft portion between the cavity walls and the axial dimension of the rib being substantially one-third of the axial distance between the walls of the cavity; said rotor member having on said rib an axial keyway opening at the inner surface of its bore and in register with the keyway in the shaft; each keyway being, throughout its length, of uniform width measured circumferentially as respects the shaft axis and said widths being substantially equal; and an elongated driving key received in the registering keyways, said key having a first part relatively tightly received in the shaft keyway and an integral second part of a length but slightly less than the axial distance between the rotor faces and provided with opposite flat faces respectively engaging the walls of the keyway in the rib, and said second part having axial extensions projecting respectively to opposite sides of the rib, and the rib keyway being formed entirely in the rib and exclusive of portions of the rotor member afforded by the counterbore, whereby the second portion of the key contacts the rotor member only in the axial zone defined by the axial width of the annular rib and the axial extensions of said second part of the key are at axially opposite sides of said rib.

References Cited in the file of this patent

UNITED STATES PATENTS

| | | |
|---|---|---|
| 982,895 | Stoker | Jan. 31, 1911 |
| 2,606,497 | Witherell | Aug. 12, 1952 |
| 2,619,040 | Maisch | Nov. 25, 1952 |
| 2,682,760 | Shenk | July 6, 1954 |
| 2,705,459 | Dunning | Apr. 5, 1955 |

UNITED STATES PATENT OFFICE
CERTIFICATE OF CORRECTION

Patent No. 2,842,006                                                                 July 8, 1958

John H. Edman

It is hereby certified that error appears in the printed specification of the above numbered patent requiring correction and that the said Letters Patent should read as corrected below.

Column 5, line 68, for "axis distance" read -- axial distance --; column 6, line 9, for "asid" read -- said --; line 29, for "flt" read -- fit --.

Signed and sealed this 23rd day of September 1958.

(SEAL)
Attest:

KARL H. AXLINE                                           ROBERT C. WATSON

Attesting Officer                                        Commissioner of Patents